US010454895B2

(12) United States Patent
Feroz et al.

(10) Patent No.: US 10,454,895 B2
(45) Date of Patent: *Oct. 22, 2019

(54) METHOD AND APPARATUS FOR APPLICATION AWARENESS IN A NETWORK

(71) Applicant: VMware, Inc., Palo Alto, CA (US)

(72) Inventors: Azeem Feroz, San Jose, CA (US); Binyuan Chen, Belmont, CA (US); Amit Chopra, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,861

(22) Filed: Sep. 12, 2016

(65) Prior Publication Data

US 2016/0380972 A1    Dec. 29, 2016

Related U.S. Application Data

(63) Continuation of application No. 13/767,686, filed on Feb. 14, 2013, now Pat. No. 9,444,841.

(51) Int. Cl.
*H04L 29/06* (2006.01)
*G06F 21/55* (2013.01)
*G06F 21/44* (2013.01)

(52) U.S. Cl.
CPC .......... *H04L 63/0263* (2013.01); *G06F 21/44* (2013.01); *G06F 21/554* (2013.01);
(Continued)

(58) Field of Classification Search
CPC ........ H04L 69/16; H04L 69/32; H04L 69/161
See application file for complete search history.

(56) References Cited

U.S. PATENT DOCUMENTS

| 8,095,786 B1 * | 1/2012 | Kshirsagar | ............ H04L 63/164 713/151 |
| 2005/0182958 A1 * | 8/2005 | Pham | ...................... G06F 21/51 726/22 |

(Continued)

OTHER PUBLICATIONS

Munro, Andrew, Patent Examination Report No. 1, equivalent Australian Application No. 2013378115, dated Apr. 5, 2016, 3 pages.

(Continued)

*Primary Examiner* — Jason K Gee

(57) ABSTRACT

A method for enforcing a network policy is described herein. In the method, a network socket event request from an application executing in a first context is intercepted by an agent prior to the request reaching a transport layer in the first context. A context refers to virtualization software, a physical computer, or a combination of virtualization software and physical computer. In response to the interception of the request, the agent requests a decision on whether to allow or deny the network socket event request to be communicated to a security server executing in a second context that is distinct from the first context. The request for a decision includes an identification of the application. The agent then receives from the security server either an allowance or a denial of the network socket event request, the allowance or denial being based at least in part on the identification of the application and a security policy. The agent blocks the network socket event from reaching the transport layer when the denial is received from the security server. In one embodiment, the method is implemented using a machine readable medium embodying software instructions executable by a computer.

20 Claims, 7 Drawing Sheets

(52) U.S. Cl.
CPC .......... *H04L 63/0218* (2013.01); *H04L 63/10* (2013.01); *H04L 63/1416* (2013.01); *H04L 63/1441* (2013.01); *H04L 63/166* (2013.01); *H04L 63/168* (2013.01); *H04L 63/20* (2013.01)

(56) References Cited

U.S. PATENT DOCUMENTS

| | | | |
|---|---|---|---|
| 2007/0073858 A1* | 3/2007 | Lakshmi Narayanan | H04L 63/1408 709/223 |
| 2009/0089879 A1 | 4/2009 | Wang et al. | |
| 2009/0279547 A1* | 11/2009 | Mistry | H04L 41/5019 370/392 |
| 2009/0288167 A1 | 11/2009 | Freericks et al. | |
| 2010/0122313 A1* | 5/2010 | Ivgi | G06F 21/6218 726/1 |
| 2010/0198698 A1* | 8/2010 | Raleigh | G06Q 30/0601 705/26.1 |
| 2014/0304763 A1* | 10/2014 | Ma | H04L 63/02 726/1 |

OTHER PUBLICATIONS

Adkhis, Franck, International Search Report and Written Opinion, equivalent International Application No. PCT/US2013/026225, dated Jun. 13, 2013, 8 pages.

Unknown, "Digging Deeper Into Deep Packet Inspection (DPI)", Allot Communications, Apr. 2007, pp. 1-12.

Ben Pfaff, "Improving Virtual Hardware Interfaces", Dissertation Submitted to the Department of Computer Science and the Committee on Graduate Studies of Standford University, Oct. 2007, 117 pages.

\* cited by examiner

METHOD AND APPARATUS FOR APPLICATION AWARENESS IN A NETWORK

CLAIM OF PRIORITY

This application is a continuation of U.S. patent application Ser. No. 13/767,686 entitled "Method and Apparatus for Application Awareness in a Network" filed on Feb. 14, 2013, the entirety of which is incorporated herein.

BACKGROUND

Description of Related Art

Virtualized environments rely on firewall rules to protect networks from malicious traffic. Such firewall rules make decisions based on network socket information. Port information that is extracted from packet headers can be the basis for firewall rules to allow or deny traffic. For example, a firewall can allow or deny HTTP traffic by blocking or allowing traffic on the network port assigned by convention to HTTP traffic, i.e., port 80. Although this approach is easy to apply, the resulting network firewalling is unreliable. For example, applications can open up port 80 for HTTP traffic and allow malicious traffic falsely identified as HTTP traffic. Alternatively, non-malicious HTTP traffic can occur through a port other than port 80, and be mistakenly treated as malicious non-HTTP traffic due to the nonstandard port. Further, even traffic correctly identified as HTTP traffic can be malicious.

Deep packet inspection (DPI) is an alternative to port blocking. Compared to port blocking, with DPI the packet payload is examined to determine the protocol and can detect malicious contents using a variety of techniques. Thus, a DPI-based firewall can identify and block malicious traffic with significantly more accuracy than port blocking.

Unfortunately, DPI has various disadvantages. Packet inspection requires significant processing resources that can increase network latency. Further, DPI requires a huge database of traffic signatures because of the large variation in possible traffic signatures to detect malicious traffic, and frequent updates of the database. Finally, if network traffic is encrypted, DPI will fail to extract properties of the encrypted payloads of the network traffic. Even if an SSL proxy decrypts the packets to resolve this latter disadvantage, such an SSL proxy decreases throughput.

SUMMARY

A method for enforcing a network policy is described herein. In the method, a network socket event request from an application executing in a first context is intercepted by an agent prior to the request reaching a transport layer in the first context. A context refers to virtualization software, a physical computer, or a combination of virtualization software and physical computer. In response to the interception of the request, the agent requests a decision on the network socket event request to be communicated to a security server executing in a second context that is distinct from the first context. The request for a decision includes an indication of the identification of the application. The agent then receives from the security server either an allowance or a denial of the network socket event request, the allowance or denial being based at least in part on the identification of the application and a network policy. The agent blocks the network socket event from reaching the transport layer when the denial is received from the security server. In one embodiment, the method is implemented using a machine readable medium embodying software instructions executable by a computer.

DETAILED DESCRIPTION

Figure 1:
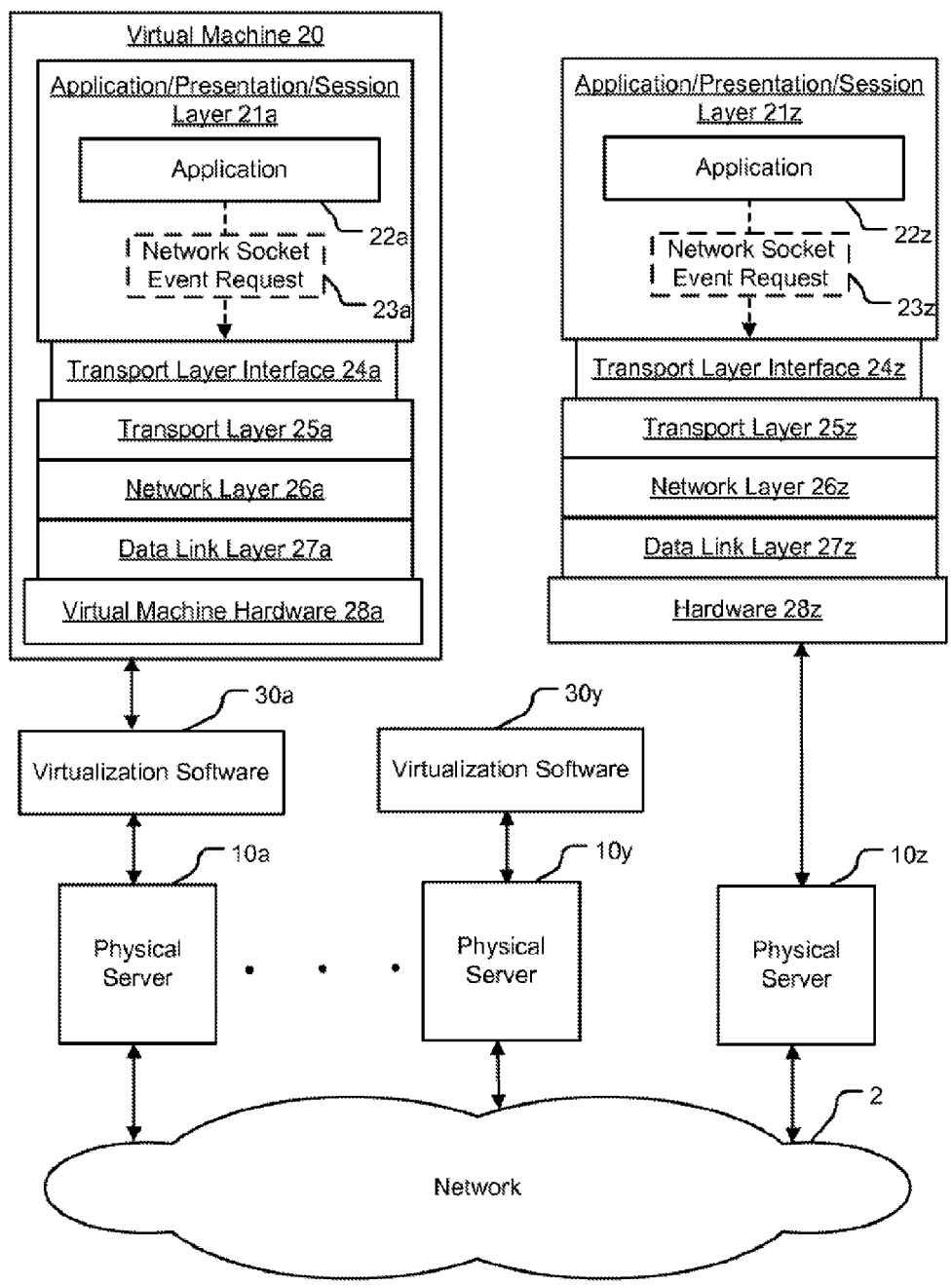
FIG. 1 is a block diagram showing a network socket event request that is generated within a networking layer stack of a virtual machine.

FIG. 1 is a block diagram showing virtual machine 20 in the process of issuing a network socket event request that is generated within a networking layer stack of a virtual machine. A virtual machine 20 is managed by virtualization software 30a executing on physical server 10a. Virtualization software 30a can also manage additional virtual machines. Virtualization software 30a can be native or hosted, and manages one or more virtual machines, permitting multiple concurrent instances of operating systems on the same computer hardware resources. The computer hardware resources include physical servers 10a to 10z, interconnected by network 2 shown as a network cloud. Physical servers 10a to 10z include processors, memories, and non-transitory computer readable media with computer readable instructions executable by a computer performing the technology described herein. Any number of servers 10a-10z may reside on network 2, and any number of virtual machines 20 may reside on each physical server 10a-10z. For example, virtualization software 30y is executing on physical server 10y, and physical server 10z does not have executing virtualization software. The servers 10a-10z may include a security server.

Within virtual machine 20, multiple networking layers may be stacked, with the physical layer conceptually located on the bottom of the stack. The physical layer is shown as virtual machine hardware 28a. Above the virtual machine hardware 28a is data link layer 27a. Above data link layer 27a is network layer 26a. Above network layer 26a is transport layer 25a. Above transport layer 25a is application/presentation/session layer 21a. An application 22a may be executing in application/presentation/session layer 21a.

Application 22a sends a network socket event request 23a. A network socket is an endpoint with a local address and local port. A resulting network connection includes a source IP, source port, protocol, destination IP, and destination port. Connection-oriented sockets such as TCP sockets may have a connection state, though not connectionless sockets such as UDP sockets. Network socket event request 23a may be a status change in a network socket, for example requested UDP or TCP events such as network open, network close, and listen.

A transport layer interface 24a is positioned between transport layer 25a and application/presentation/session layer 21a. In one embodiment, transport layer interface 24a may intercept network socket event request 23a from application/presentation/session layer 21a prior to the network socket event request 23a reaching transport layer 25a.

Examples of transport layer interface 24a are the Transport Driver Interface (TDI) and the Windows Filtering Platform (WFP) on Windows platforms. In other embodiments, transport layer interface 24a is provided on Linux platforms, Mac OS platforms, or other platforms.

Requested network events can be tied to the requesting application as follows. In some embodiments, TDI clients above transport layer 25a, such as afd.sys, communicate using I/O request packets (IRPs) with TDI transports such as TCPIP.sys and TCPIP6.sys. Because the IRP is generated in context of application 22a, transport layer interface 24a can identify application 22a as the source of network socket events that start a network connection such as OPEN and LISTEN. For example, transport layer interface 24a can identify the process ID of requesting application 22a from the IRP, and then map the process ID to the binary image of application 22a to the process ID. During the course of the network connection, application 22a may generate other network socket events such as SEND, RECEIVE, and CLOSE. Because TDI clients also use IRPs to generate these events, transport layer interface 24 can identify and map them to the requesting application 22a and the process ID in the same manner.

An alternative to the transport layer interface 24a is a layered service provider that can allow or block the network socket event request 23a and can reside conceptually above a base transport provider. For example, a Winsock or Winsock 2 service provider interface (SPI) can be implemented by a module that allows or blocks the network socket event request 23a, while relying on an underlying base TCP/IP stack.

Virtual machine 20 may rely on another virtual machine distinct from virtual machine 20 (such as security virtual machine 80 shown in FIG. 2) to decide whether to allow or deny the network socket event request 23a. Security virtual machine 80 may base its decision on policies that may be centrally-managed. In some embodiments, an agent 29, discussed below with reference to FIG. 2, in virtual machine 20 communicates with transport layer interface 24a, and sends a request for a decision on whether to allow or deny a network socket event to security virtual machine 80. The request may include information about the application 22a such as application file name, application executable hash, application identifier and user/domain of application 22a. Agent 29 receives a decision from security virtual machine 80 and then allows or denies network socket event request 23a.

In another embodiment, a network policy might be enforced by a component different from the security virtual machine. The security virtual machine consumes the application information from the network socket event and evaluates its network policy with this application information. If a match is found such that the application information identifies an application subject to the network policy, the security virtual machine generates one or more appropriate firewall rules that are pushed to an enforcement engine. The enforcement engine can reside on its own physical server machine or share the physical server machine with another part of the described technology.

Based on the decision on whether to allow or deny a network socket event, agent 29 either forwards network socket event request 23a to transport layer 25a or discards it. If agent 29 forwards network socket event request 23a to transport layer 25a, network socket event request 23a is processed on a layer-by-layer basis by transport layer 25a, network layer 26a, data link layer 27a, and virtual machine hardware 28, followed by resulting network activity via the network 2.

Physical server 10z does not have executing virtualization software. Physical server 10z has application/presentation/session layer 21z, application 22z, network socket event request 23z, transport layer interface 24z, transport layer 25z, network layer 26z, data link layer 27z, and hardware 28z. Network socket event request 23z functions in a manner similar to network socket event request 23a, but in a non-virtual context.

Figure 2:
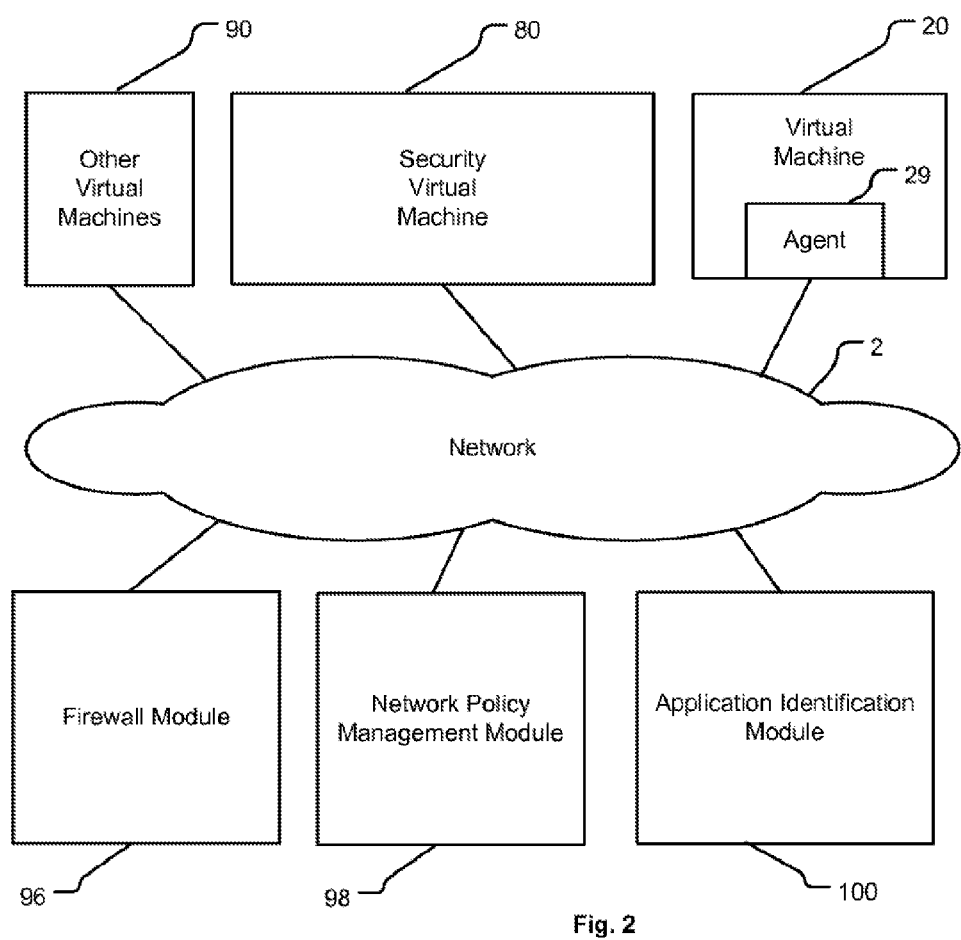
FIG. 2 is a functional block diagram showing an architecture with multiple virtual machines among which requests for decisions on network sockets and corresponding decisions are communicated.

FIG. 2 is a block diagram showing an architecture with virtual machine 20 including agent 29, security virtual machine 80, other virtual machines 90, network firewall module 96, network policy management module 98, and application identification module 100. A network administrator can determine the network policy via a network policy management module 98. Firewall rules implementing the network policy can be determined by security virtual machine 80. The application identification module 100 can provide application identification information, to assist the security virtual machine 80 in making a determination on whether to allow or block a network socket event request from agent 29 of virtual machine 20. The enforcement of this determination can be carried out by virtual machine 20 which could block or allow the network socket from further processing within the virtual machine 20, or by firewall module 96 which could block or allow the specific network connection.

Agent 29 in virtual machine 20 may be implemented as a computer program that runs in the background, as a service or daemon. The various virtual machines and modules can be on one or more physical servers. In another embodiment, security virtual machine 80 can be replaced or complemented by a security module in virtualization software 30a or a physical appliance residing on network 2 (shown in FIG. 1). In various embodiments, the network firewall module 96 can be virtual or physical.

Figure 3:
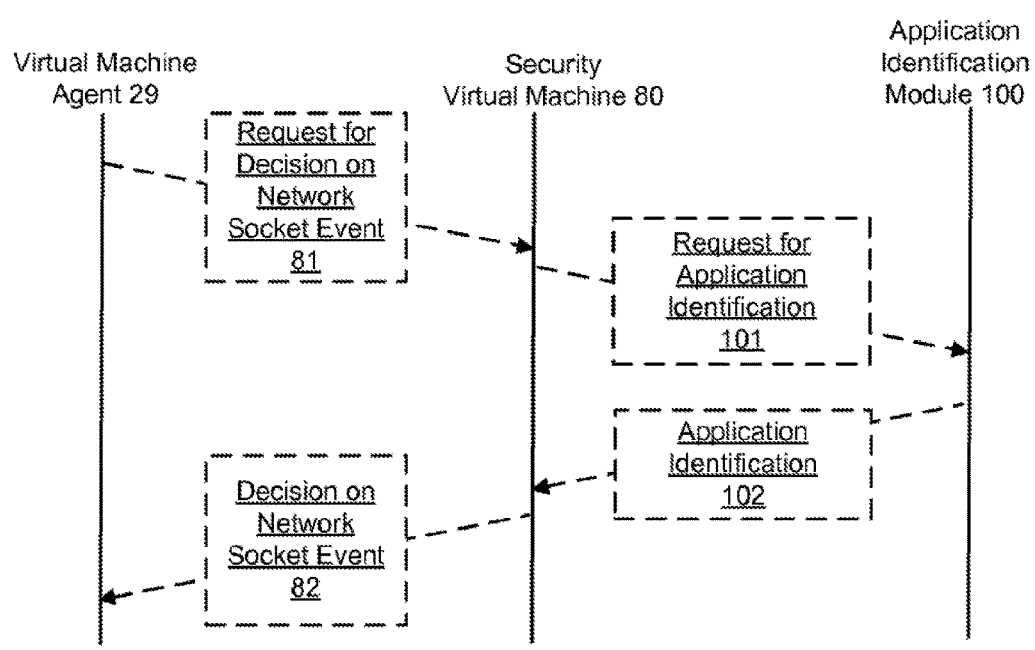
FIG. 3 is a bounce diagram in a virtual machine context, showing a decision on a network socket event request based on application identification.

FIG. 3 is a bounce diagram in a virtual machine context, showing a decision on a network socket event request based on application identification. In one embodiment, agent 29 sends a request for a decision on whether to allow or deny a network socket event 81, to security virtual machine 80, via network 2. To make the decision requested by virtual machine 20, the security virtual machine 80 relies on application information about application 22 which sent the network socket event request 23 (from FIG. 1) that prompted the request for a decision on whether to allow or deny a network socket event 81 from application identification module 100. Accordingly, the request 81 includes application context information such as application name, a hash of application's executable file, some other application identifier, or the user/domain of the application 22.

The security virtual machine 80 sends request for application identification 101 to application identification module 100, via network 2. The application context information is used by the application identification module 100 to generate more information on the application 22 which sent the network socket event request 23, such as product name, vendor name, application category, application threat level, etc. Firewall rules of a network policy on the security virtual machine 80 can be based on any of this application metadata The request for application identification 101 leads to a match between a signature of the application initiating the network socket event request, and a reference application signature in a signature database relied on by the application identification module 100.

In various embodiments, the application signature is based on at least a filename of the executable file of the application, a hash of an executable file of the application, and/or the executable file of the application. The application identification module 100 responds back to the security virtual machine 80 via network 2 with application identification information 102.

Examples of application identification information 102 are application name, version, category, manufacturer, trust level, and threat level. The application identification information 102 can be used by the security virtual machine 80 to implement firewall rule-based decisions about whether to allow or deny network socket event requests.

In various embodiments the firewall rules resulting from a network policy, and/or the network policy are stored and updated at the security virtual machine 80, or a centralized network policy management module separate from and accessible to security virtual machine 80. The centralized network policy management module may be on a separate centralized network policy management server or share a physical server with a virtual machine. Via the centralized network policy management module, an administrator can define a network policy that determines the firewall rules. New rules may be pushed to the security virtual machine 80 (and other security virtual machines) according to a security virtual machine registration scheme.

Example network policies are:
 (i) Block/allow all traffic of protocol X initiated by application Y when receiving a connection state message Z, such as "Block all TCP traffic initiated by uTorrent when receiving a SYN_SENT event".
 (ii) Block/allow all TCP traffic initiated by application Y.
 (iii) Block/allow all network traffic initiated by application Y belonging to category Z (P2P for instance)
 (iv) Block/allow all network traffic initiated by applications made by vendor Z.

In some embodiments, the application identification is advantageous, because of the reduction or elimination of deep packet inspection in virtual machine 20 or other virtual machines 90 in connection with approving or denying network socket event requests, without sacrificing accuracy in identifying applications that request network socket events.

The application identification module 100 may also be implemented as a cloud based application identification service. In other embodiments, the application identification module 100 is located in security virtual machine 80, in virtualization software 30*a*, or in another virtual machine accessed by network 2. Such relatively centralized embodiments minimize the overhead in the application signature updates. The application identification module 100 contains a central signature database that maps application signatures to application identities. The central signature database decreases the number of locations that rely on signature updates. The signature may be a sufficiently complete indication to identify the application requesting the network socket event. In other embodiments, the indication may be insufficiently complete to identify the application, but nevertheless a sufficiently complete indication to identify the application as safe (such that the network socket event should be allowed) or unsafe (such that the network socket event should be denied).

In yet another embodiment, the application identification module 100 is located in virtual machine 20, although this can have the disadvantage of requiring application signature updates at every virtual machine which requires decision on whether to allow or deny network socket event requests.

To make the decision on network socket event 82, the security virtual machine 80 applies a network security policy to the application identification information 102, which results in firewall rules implementing the network security policy. The decision on network socket event 82 is sent back to the virtual machine 20 which sent the request for decision on network socket event. In another embodiment, the decision on network socket event 82 is sent back to a firewall that enforces the decision. Such a firewall can be a virtual firewall or a physical firewall. Firewall policies and updates for the security virtual machine 80 can be communicated from network 2, and, in some embodiments, from a separate policy management module (not shown).

In yet another embodiment, the security virtual machine 80 also processes requests for decisions on whether to allow or deny network socket events, for other virtual machines connected via network 2. Other virtual machines send requests for such decisions to the security virtual machine 80. To make the decisions requested by other virtual machines, the security virtual machine 80 relies on application information that is requested from application identification module 100, which provides the security virtual machine 80 with application identification information. The security virtual machine 80 applies firewall policies to the application identification information, and sends the resulting decisions on network socket events back to the corresponding other virtual machines 90 which sent the requests for decisions on network socket events.

Figure 4:
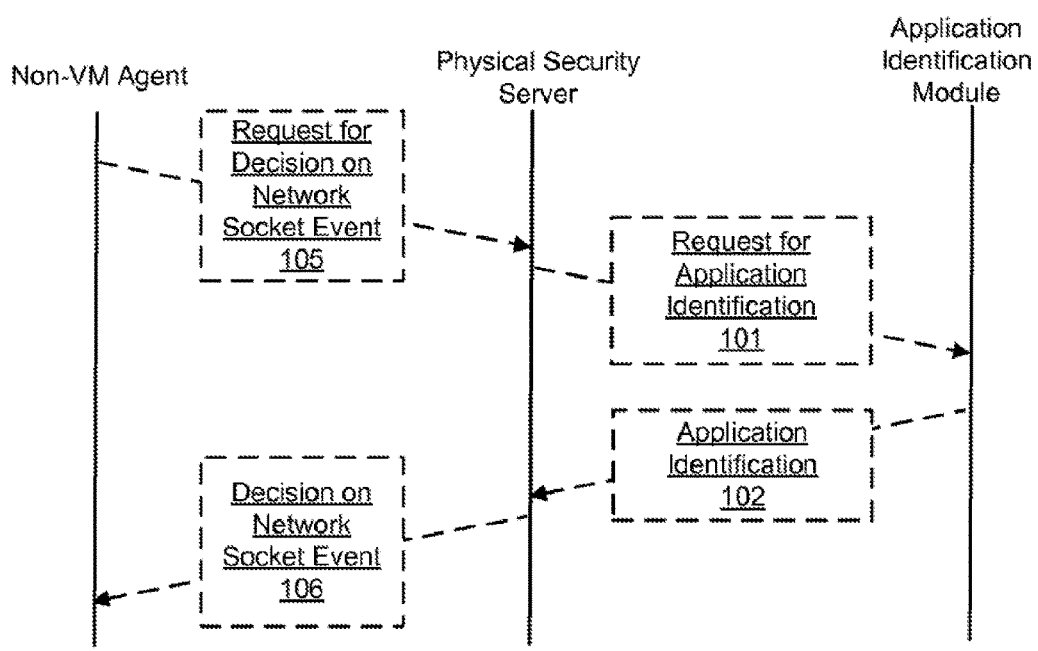
FIG. 4 is a bounce diagram in a non-virtual machine context, showing a decision on a network socket event request based on application identification.

FIG. 4 is a bounce diagram in a non-virtual machine context, showing a decision on a network socket event request based on application identification. The operations are similar to FIG. 3. However, a physical security server replaces the security virtual machine, and a non-virtual machine agent replaces the virtual machine agent. In another embodiment, the physical security server also processes requests for whether to allow or deny network socket events for other non-virtual machine agents.

Other embodiments combine aspects of FIGS. 3-4. For example, non-virtual machine agents and virtual agents can be combined. Non-VM agents can be used with a security virtual machine. VM agents can be used with a physical security server.

Figure 5:
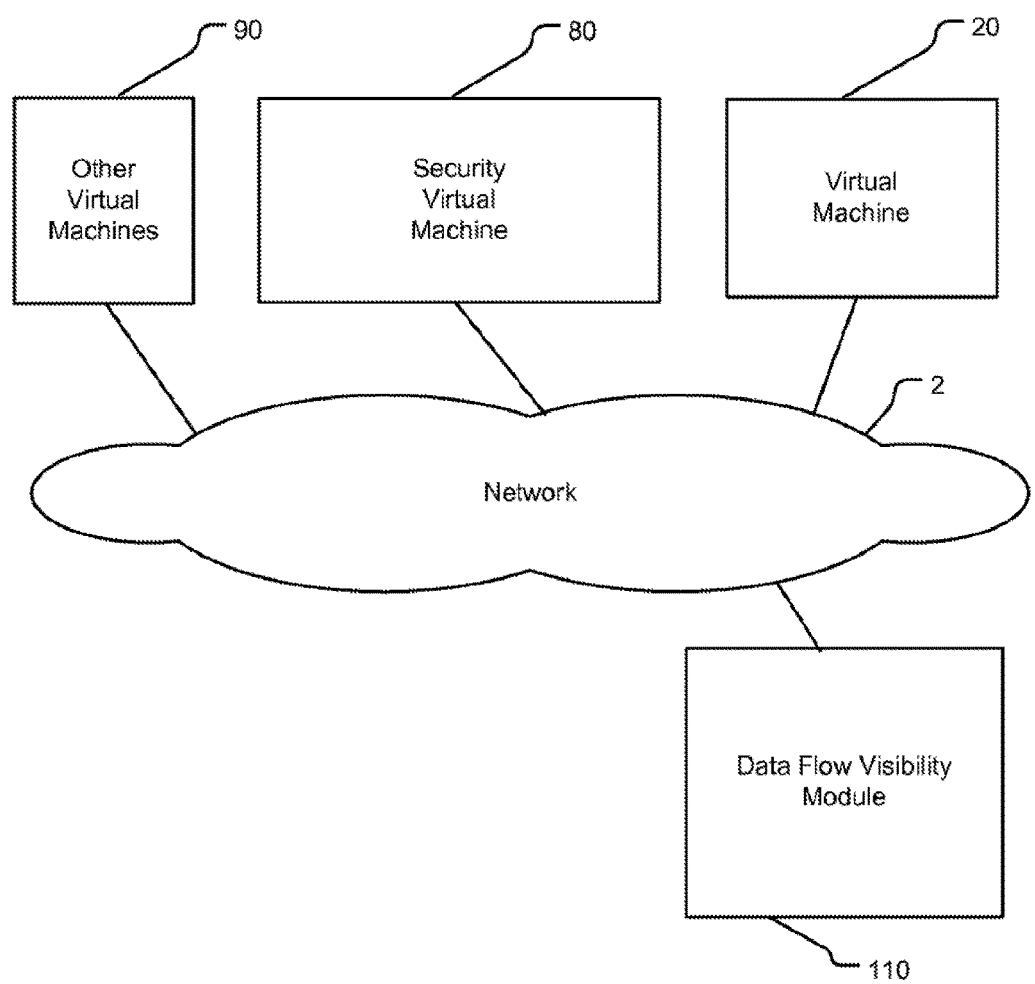
FIG. 5 is a functional block diagram showing an architecture with multiple virtual machines among which statistics about data flows through requested network sockets are communicated.

FIG. 5 is a block diagram showing an architecture with virtual machine 20, security virtual machine 80, other virtual machines 90, and data flow visibility module 110. The various virtual machines and modules can be on or more physical servers. Within virtual machines, the TDI/WFP transport layer interface can collect statistics on network sockets. Outside the virtual machines, any module gathering or tracking connection-level statistics can perform the same. Security virtual machine 80 can collect statistics on data flows through network connections requested by virtual machine 20 and other machine 90. Data flow visibility module 110 can request and receive the aggregated statistics. In another embodiment, security virtual machine 80 can be replaced or complemented by a security module in virtualization software 30*a* or an appliance residing on network 2 (shown in FIG. 1). In other embodiments, the network firewall or host connection tracking module can collect statistics on data flows through network connections requested by virtual machine 20 and other machine 90 (for example, information about applications on a per-connection basis).

Figure 6:
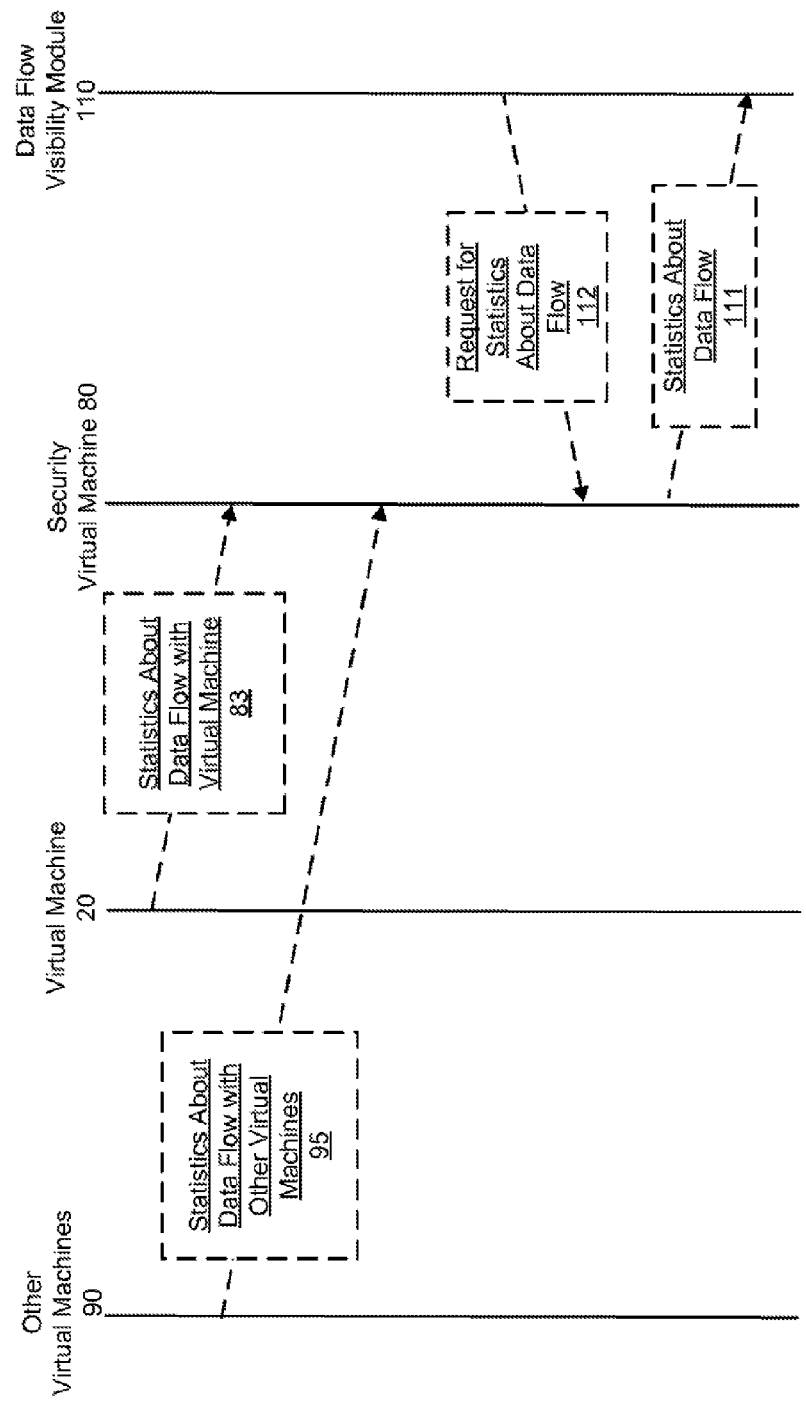
FIG. 6 is a bounce diagram in a virtual machine context, showing the aggregation of statistics about data flow with virtual machines.

FIG. 6 is a bounce diagram in a virtual machine context, showing the aggregation of statistics about data flow with virtual machines. In one embodiment, virtual machine 20 sends statistics about data flow 83 (through the requested network sockets of virtual machine 20) to security virtual machine 80, via network 2. Other virtual machines 90 also send statistics about data flow 95 (through the requested network sockets of their respective virtual machines) to security virtual machine 80 via network 2. Such statistics can be sent to the security virtual machine 80 at intervals, e.g. every 30 seconds. The network sockets can be requested and approved as discussed in connection with FIGS. 3-4.

Security virtual machine 80 aggregates the statistics about data flow 83 from virtual machine 20 and the statistics about data flow 95 from the other virtual machines 90. The aggregated statistics can be processed to indicate network flow information as bytes/packets per application, per user, per virtual machine, etc. In some embodiments, aggregated statistics per application are particularly reliable, because of the application identification process discussed in connection with FIGS. 1 and 2. In turn, such aggregated statistics can be considered in modifying firewall policies for subsequent decisions on requests for decisions on network socket events. Data flow statistics through network sockets that are approved under such modified firewall policies can be aggregated as shown. Data flow visibility module 110 requests statistics about data flow 112. The security virtual machine 80 responds with the aggregated statistics 111.

Figure 7:
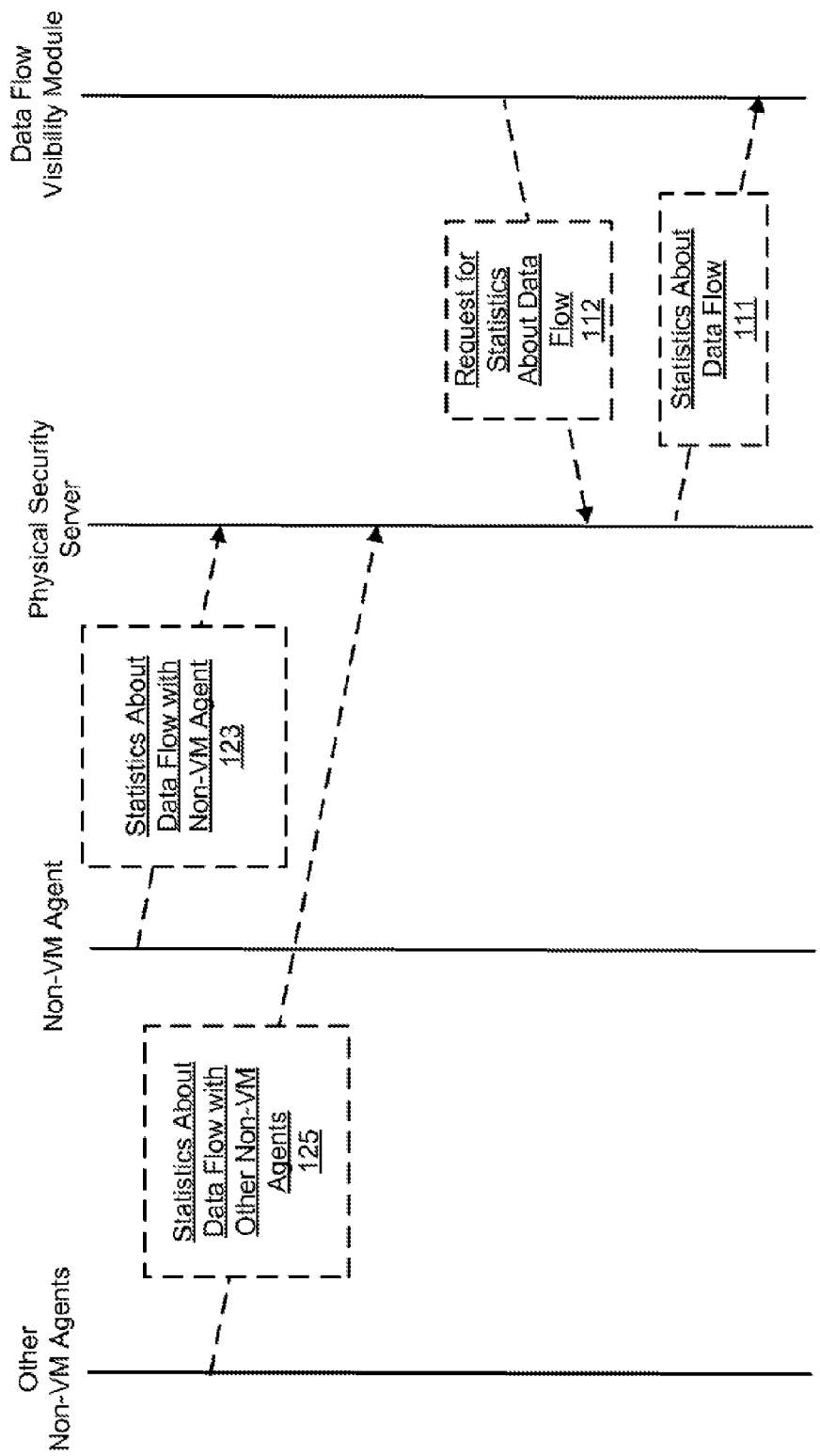
FIG. 7 is a bounce diagram in a non-virtual machine context, showing the aggregation of statistics about data flow with non-virtual machine agents.

FIG. 7 is a bounce diagram in a non-virtual machine context, showing the aggregation of statistics about data flow with non-virtual machine agents. The operations are similar to FIG. 8. However, a physical security server replaces the security virtual machine, and a non-virtual machine agent replaces the virtual machine agent, and other non-VM agents replace other virtual machines.

Other embodiments combine aspects of FIGS. 7-8. For example, non-virtual machine agents and virtual agents can be combined. Non-VM agents can be used with a security virtual machine. VM agents can be used with a physical security server.

Examples of architectures that can implement the disclosed technologies are hypervisor and other virtualization products by Citrix, Microsoft, VMWare, and the Xen community.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for enforcing a network policy on an application executing within a first context, the method comprising:

intercepting, by an agent executing in the first context, a network socket event request from the application before the network socket event request reaches a transport layer located between a network layer and the application in a network stack of the first context;

sending, by the agent to a security server executing in a second context, a request for a decision on whether to allow or deny the intercepted network socket event, the request for the decision including application information comprising a domain of the application;

receiving, by the agent, the decision from the security server, the decision being an allowance or a denial of the network socket event request, the decision being based at least in part on the application information; and preventing, by the agent, the network socket request from reaching the transport layer in the first context when the decision is the denial of the network socket event request.

2. The method of claim 1, wherein the request for the decision further includes application information comprising an identification of a user of the application, an application file name, an application executable hash, and an application identifier.

3. The method of claim 1, further comprising:

sending the network socket event request from the application in the first context to the transport layer in the first context.

4. The method of claim 1, wherein the request for the decision further includes application information comprising an application file name, an application executable hash, and an application identifier.

5. The method of claim 1, further comprising:

collecting statistics about data flow through the network socket of the first context;

sending the statistics from the first context, to a data collection module that receives statistics about data flows through multiple network sockets of multiple contexts; and generating a report of the statistics about the data flows through the multiple network sockets of the multiple contexts.

6. The method of claim 1, wherein the network event is any of: opening the network socket, closing the network socket, and listening to the network socket.

7. The method of claim 1, wherein the application identifier is based on at least a process identifier that identifies (i) a process created when an operating system loads and runs an executable file of the application, and (ii) the executable file of the application.

8. The method of claim 1, wherein a transport layer interface located between the transport layer and the application intercepts the network socket event, and the transport layer interface is a Transport Driver Interface.

9. The method of claim 1, wherein the transport layer interface is a layered service provider that allows or blocks network socket event requests and resides above a base transport provider.

10. A non-transitory computer-readable medium with computer readable instructions executable by a context, comprising:

instructions that perform, intercepting, by an agent executing in the first context, a network socket event request from the application before the network socket event request reaches a transport layer located between a network layer and the application in a network stack of the first context;

instructions that perform, sending, by the agent to a security server executing in a second context, a request for a decision on whether to allow or deny the intercepted network socket event, the request for the decision including application information comprising a domain of the application;

instructions that perform, receiving, by the agent, the decision from the security server, the decision being an allowance or a denial of the network socket event request, the decision being based at least in part on the application information; and instructions that perform, preventing, by the agent, the network socket request from reaching the transport layer in the first context when the decision is the denial of the network socket event request.

11. The non-transitory computer-readable medium of claim 10,
wherein the application identifier is based on data received from an interface of the transport on the first context.

12. The non-transitory computer-readable medium of claim 10, further comprising:
instructions sending the network socket event request from the application in the first context to the transport layer in the first context.

13. The non-transitory computer-readable medium of claim 10, wherein the security module makes decisions on whether to allow or deny network socket events in multiple contexts.

14. The non-transitory computer-readable medium of claim 10, wherein the network event is any of: opening the network socket, closing the network socket, and listening to the network socket.

15. The non-transitory computer-readable medium of claim 10, wherein the transport layer interface is a layered service provider that allows or blocks network socket event requests and resides above a base transport provider.

16. The non-transitory computer-readable medium of claim 12, further comprising:
instructions collecting statistics about data flow through the network socket of the first context; and
instructions sending the statistics from the first context, to a data collection module that receives statistics about data flows through multiple network sockets of multiple contexts; and
instructions generating a report of the statistics about the data flows through the multiple network sockets of the multiple contexts.

17. A computer system, comprising:
an agent executing in a context;
a security server executing in a second context;
a firewall; and
a processor and memory with the context, the context executing:
instructions that perform, receiving, by the security server, a request from the for a decision on whether to allow or deny a network socket event request from an application, the network socket event request being intercepted by the agent before the network socket event request reaches a transport layer located between a network layer and the application in a network stack of the context, the request for the decision including application information comprising a domain of the application; and
instructions that perform, sending, by the security server, the decision to the firewall that enforces the decision, the decision being an allowance or a denial of the network socket event request, the decision being based at least in part on the application information, and wherein the denial prevents the network socket request from reaching the transport layer in the context.

18. The system of claim 17, wherein the application information comprises an identification of a user of the application, an application file name, an application executable hash, and an application identifier.

19. The system of claim 17, wherein the context further executes instructions that perform sending the network socket event request from the application in the context to the transport layer in the context.

20. The system of claim 17, wherein the transport layer interface is a layered service provider that allows or blocks network socket event requests and resides above a base transport provider.

* * * * *